(12) United States Patent
Carpentier et al.

(10) Patent No.: US 6,295,100 B1
(45) Date of Patent: Sep. 25, 2001

(54) METHOD AND DEVICE FOR CONVERGENCE CORRECTION IN A TELEVISION RECEIVER

(75) Inventors: Dirk Carpentier, Unterkirnach; Günter Gleim, Villingen-Schwenningen; Friedrich Heizmann, Villingen-Schwenningen; Bernd Rekla, Villingen-Schwenningen, all of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/231,349

(22) Filed: Jan. 13, 1999

(30) Foreign Application Priority Data

Jan. 21, 1998 (DE) .............................................. 198 01 968

(51) Int. Cl.$^7$ ...................................................... H04N 9/28
(52) U.S. Cl. ........................................... 348/807; 348/806
(58) Field of Search .................................. 348/806, 807, 348/745, 746, 747; H04N 9/28, 3/23

(56) References Cited

U.S. PATENT DOCUMENTS

| 5,523,789 | * | 6/1996 | Oguchi | 348/805 |
| 5,559,565 | | 9/1996 | Yun | 348/806 |

OTHER PUBLICATIONS

Ohsawa, Michitaka, et al. A 46 Inch High–Resolution Rear-Projection Display. In: Journal of the SID, 1/1, 1993, S.23–36; S.29.

JP Patents Abstracts of Japan: 5–14913; 4–54091; 57–207493.

Copy of Search Report.

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

A method for convergence correction in a television receiver and to a television receiver, in particular a projection television receiver having in each case one monochromatic picture tube for the three primary colours, red, green and blue, improves the quality of convergence correction. Each picture tube is assigned a correction device which comprises a convergence circuit. The convergence circuit is assigned a memory in which correction values for the convergence correction of the three picture tubes are stored. In accordance with the correction values, the convergence circuit generates output signals, which are output to a correction device, which in each case comprise at least one correction coil and, for each correction coil, one driver circuit. A correction current is applied to the associated correction coil in order to correct image defects of a picture tube. The convergence circuit also has control means for influencing the output signals output to the correction devices in such a way that the same correction is always effected on the picture screen for a specific correction value, independently of the gain of the respective driver circuit.

13 Claims, 2 Drawing Sheets

METHOD AND DEVICE FOR CONVERGENCE CORRECTION IN A TELEVISION RECEIVER

FIELD OF THE INVENTION

The invention relates to a method for convergence correction in a television receiver, and to a television receiver with a convergence correction device.

BACKGROUND OF THE INVENTION

Convergence correction devices serve for the correction of parameters in the raster deflection, for example the correction of north/south and east/west distortions, of pincushion distortions, of nonlinearities in the deflection, and other geometric distortions in the horizontal or vertical directions. A particular field of application is convergence correction in a television projection receiver in which the pictures of three monochromatic picture tubes are projected onto a picture screen. The television receiver is understood as any receiver in which pictures are reproduced electronically or using a raster. The receiver can be fed from an arbitrary video signal source with a television broadcast signal, or as a pure monitor with an RGB signal, an FBAS signal or, separately, with a luminance signal and a colour carrier.

The correction of the deflection parameters is undertaken with the aid of correction values which are stored in a convergence circuit. The stored correction values are converted in a digital-to-analogue converter into an analogue control signal and fed to a driver circuit consisting of a pre-amplifier and an output amplifier. This driver circuit outputs a current, corresponding to the correction value, to a correction coil. The magnitude of the correction current also depends on the gain of the driver circuit, which can vary during operation, in particular owing to temperature effects.

SUMMARY OF THE INVENTION

It is the object of the invention starting from this point to specify a method by means of which it is possible to achieve an improved convergence setting.

This object is achieved by means of the method according to the invention. It has the advantage that each convergence channel of a television receiver is influenced such that the current generated by a reference value is kept constant for each convergence channel. It is ensured in this way that a specific correction value always causes the same correction on the picture screen of the television receiver.

It is expedient for the current to be measured by an electric measurement, for example by means of a measuring shunt.

It has proved to be particularly advantageous that the method according to the invention can be carried out during the vertical or horizontal blanking interval.

A second object of the invention is to create a television receiver with improved convergence correction.

This object is achieved by means of a television receiver according to the invention. It has the advantage that a current caused by a correction value is kept constant in each convergence channel independently of temporal changes in the amplification of the convergence circuit and/or the driver circuit.

In an exemplary embodiment of the invention, the convergence circuit can comprise a digital-to-analogue converter which converts the stored correction values into an output signal for at least one correction device. This exemplary embodiment permits a particularly expedient storage of the correction values in a digital storage medium, with the result that conventional memory chips can be used. At the same time, it is also possible to integrate the memory for the digital values with other required functions of the convergence circuit in a single semiconductor component.

In the said exemplary embodiment, the control means can advantageously be constructed such that the output signal output to the correction device can be influenced. It is particularly advantageous when the control means comprise electronically adjustable resistors.

In accordance with a further exemplary embodiment of the invention, however, the control means can also be constructed such that the digital value fed to the digital-to-analogue converter can be influenced. It is expedient for this to be done by multiplying a digital matching factor by the stored correction value, and feeding the product obtained in this way to the digital-to-analogue converter as input value. The matching factor, and thus the product of the correction value and the matching factor, are selected such that a specific correction is achieved on the picture screen independently of the actual gain of the driver circuit for a specific correction value.

In an exemplary embodiment of the invention, it is expediently possible to provide switching means by means of which the television receiver can be switched over optionally between two operating modes. One operating mode is active when a picture is represented on the picture screen, while the other operating mode is activated upon correction of the convergence circuit. In the last-named operating mode, a stored reference value can be processed in the convergence circuit.

BRIEF DESCRIPTION OF THE DRAWINGS

The invention is represented by way of example in the drawing, mutually corresponding elements being provided with the same reference symbols. In the drawing.

DETAILED DESCRIPTION OF PREFERRED EMBODIMENTS

Figure 1:
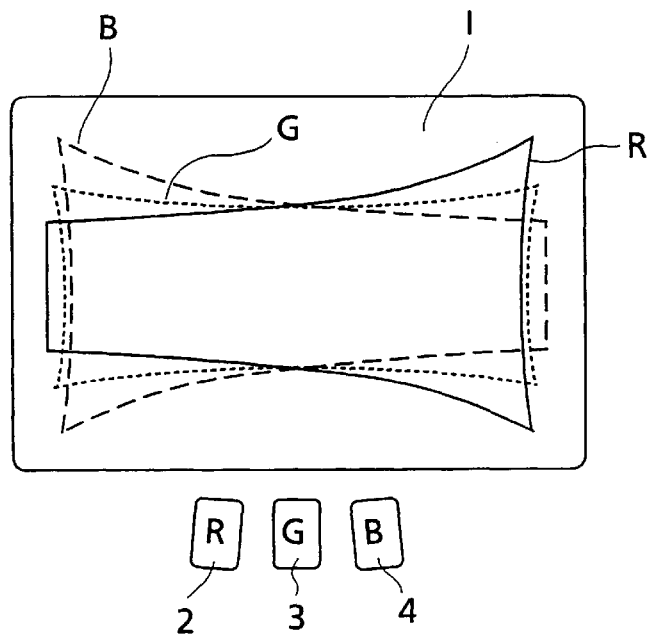
FIG. 1 shows—a top view of the screen of a colour television receiver according to the invention, without convergence correction.

FIG. 1 shows a top view from the front of the picture screen 1 of a television receiver according to the invention, onto which the pictures of three monochromatic picture tubes 2, 3, 4 are projected. As is represented diagrammatically in the figure, the picture tubes 2 . . . 4 are arranged in geometrically differing ways. Consequently, image defects which are different for the individual picture tubes occur on the picture screen. These picture errors are corrected using supplementary correction coils which are mounted upstream of the actual deflection coils on the coil neck of the picture tubes. The correction is performed for each individual picture tube 2 . . . 4 both in the horizontal and in the vertical direction, that is to say a total of six correction coils with the associated driver circuits are present in the television receiver, each being driven by a convergence circuit.

Figure 2:
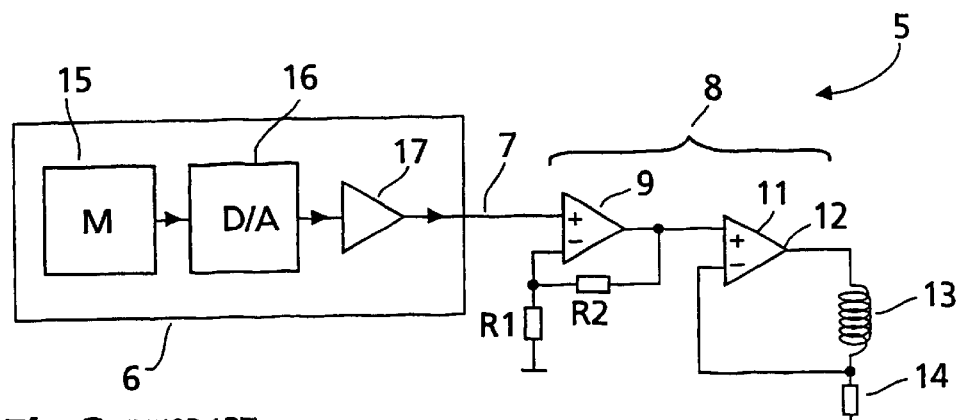
FIG. 2 shows a diagram of the convergence and correction device in a known television receiver, FIGS. 3, 4 respectively show a block diagram of two embodiments of the convergence and correction device in a television receiver according to the invention.

A convergence channel denoted as a whole by 5 such as is known in the prior art is represented diagrammatically in the block diagram of FIG. 2. A convergence circuit 6, which is constructed as an integrated switching circuit, is connected with an output 7 to a driver circuit 8 which comprises a pre-amplifier 9 and a main amplifier 11. The output 12 of the output amplifier 11 is connected to a correction coil 13 which influences the electron beam in the assigned picture tube. The correction coil 13 is connected in series to a load resistance 14. A convergence circuit 6 with the associated correction coil 13 and driver circuit 8 is denoted below in each case as a convergence channel.

The convergence correction is undertaken with the aid of stored digital convergence correction values. The convergence correction values are stored in a memory 15, denoted by M, in the convergence circuit 6, and are converted in a digital-to-analogue converter 16 into a corresponding analogue value. This analogue value is amplified by means of an amplifier 17, integrated in the convergence circuit 6, with a constant gain f1, and output at the output 7 to the driver circuit 8, which generates the desired correction current in the correction coil 13.

The way in which the convergence correction is carried out is not the subject-matter of the present invention. Methods and devices for convergence correction are known, for example, from German Patent Applications 197 35 681 and 197 04 775.

The driver circuit 8 amplifies the analogue correction value, output by the convergence circuit 6, by means of a constant gain f2, and outputs a corresponding current to the correction coil 13. As a rule, the magnitude of the gain f2 varies owing to temperature fluctuations, in particular during the warm-up phase of the television receiver. This has negative effects on the quality of the convergence setting.

Figure 3:
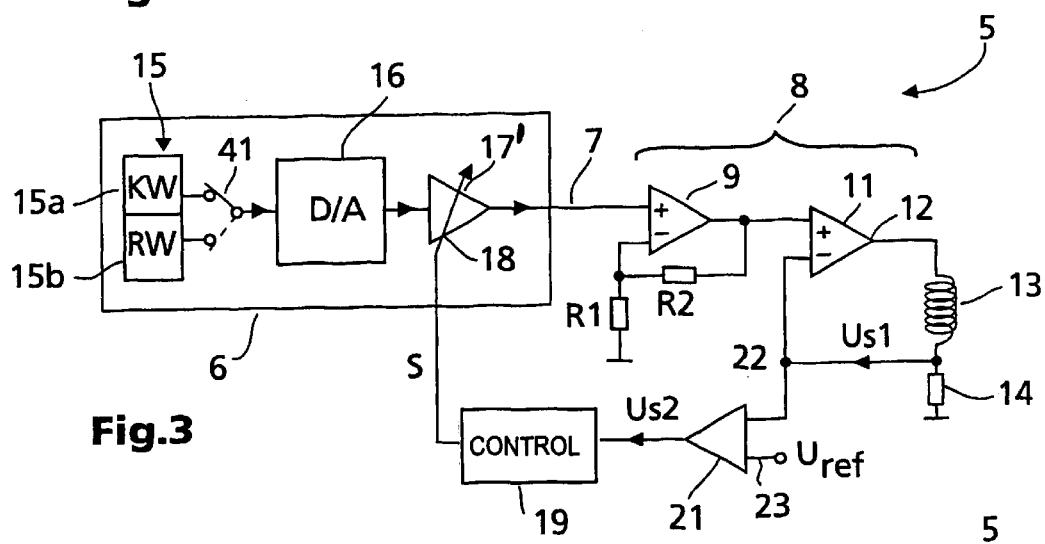

FIG. 3 shows a block diagram of a convergence channel such as is used in an exemplary embodiment of the invention. This circuit differs from that described above only in the design of the convergence circuit 6.

Here, the amplifier 17' integrated in the convergence circuit 6 is designed as an amplifier with a variable gain f1, by contrast with the known convergence circuit 6 represented in FIG. 2, in the case of which the gain f1 of the amplifier 17 is constant.

The amplifier 17 has a control input 18 into which there is input a control signal S, output by a control circuit 19, which changes the gain f1 of the amplifier 17': f1=f1(S). An input 22 of a comparator 21 is connected to the low end of the correction coil 13, and taps a voltage Us1. A second input 23 of the comparator 21 is connected to a reference voltage $U_{ref}$. The output signal Us2 of the comparator 21 is an input signal for the control circuit 19. The reference voltage $U_{ref}$ can be determined by another measurement which is not, however, the subject-matter of the present invention.

A further difference from the circuit represented in FIG. 2 is that the memory 15 is divided into a first and a second memory area 15a, 15b. The convergence values KW which are used for the convergence correction are stored in the first memory area 15a, while a television picture is represented on the screen 1. A specific reference value RW which is used to correct the convergence channel is stored in the second memory area 15b. The memory areas 15a, 15b can be addressed optionally by a switch 41, depending on which operating state of the circuit currently obtains. The operating state during which a picture is represented is denoted below as "display mode". The operating state during which the reference value is output is denoted below as "test mode".

The analogue value output by the digital-to-analogue converter 16 is always amplified by a factor f0 which is equal to the product of f1 and f2: f0=f1×f2. By matching the gain f1(S) for all convergence channels, it is possible to achieve in the case of the circuit according to the invention that f0=const., independently of whether f2 varies. The matching of the gain f1(S) can be performed, for example, during a line denoted as a "measuring line" within the vertical blanking interval. When the matching or correction of the gain f1(S) is performed periodically, an optimum convergence correction is achieved in this way even during the warm-up phase of the receiver. As soon as a constant operating temperature is reached, the correction can be performed at longer time intervals than in the warm-up phase.

Figure 4:
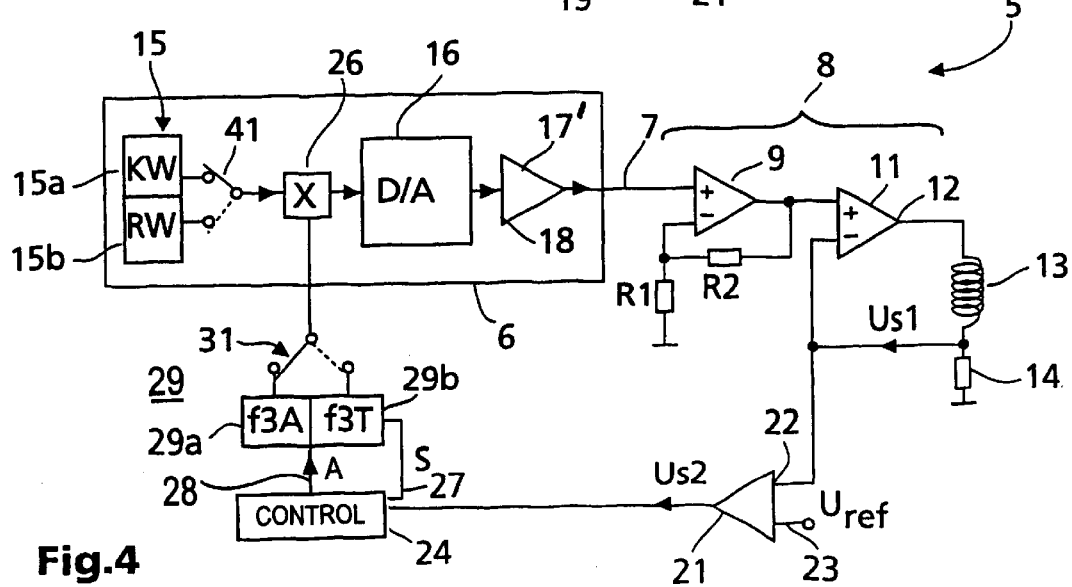

An alternative embodiment of the circuit represented in FIG. 3 is shown in FIG. 4. Instead of the amplifier 17' with a variable gain f1(S), in this embodiment an amplifier 17 which again has a constant gain f1 is integrated in the convergence circuit 6. However, by contrast with the circuits described so far, provision is made of a multiplier stage 26 in which the convergence correction values KW read out of the memory area 15a are multiplied by a matching factor f3. The same holds for a reference value RW read out from the memory 15b. The product of these two digital values is input into the input of the digital-to-analogue converter 16 and then processed further in the same way as in the circuit described in FIG. 2. In this case, it holds for the total gain f0 that f0=f1×f2×f3. It is again achieved as a result in this way that the total gain can be corrected to a constant value for all convergence channels. The D/A converter 16 and the multiplier stage 26 can also be replaced by a multiplying D/A converter.

As in the exemplary embodiment of the invention represented in FIG. 3, the comparator 21 is connected to a control unit 24. The control unit 24 has an output 27 at which a digital signal f3T is output, as well as an output 28, at which a selection signal A is output. The selection signal A initiates a copying operation in which the contents of the memory 29b are copied into the memory 29a. The last-named signals are input signals for a memory 29 in which matching factors f3A and f3T are stored in two memory areas 29a and 29b. Also provided is a switching element 31 which optionally connects the memory area 29a or 29b to the multiplier stage 26. The switching element 31 is operated such that the factor f3A is active during the display mode, and the factor f3T is active during the test mode.

Figure 5:
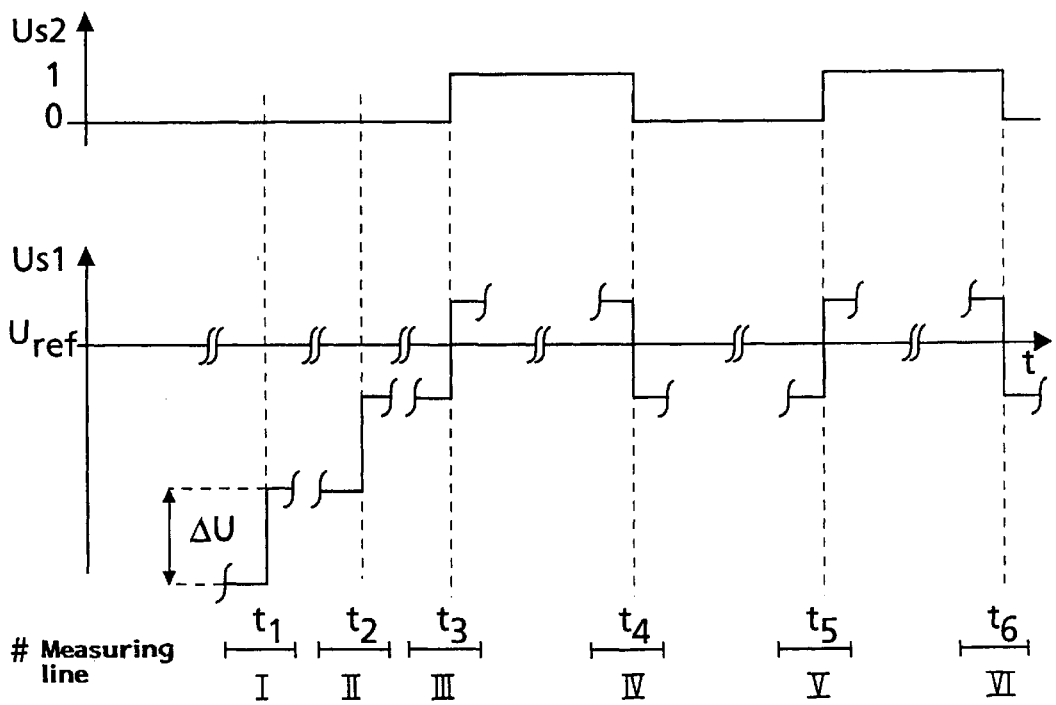
FIG. 5 shows the illustration of the method according to the invention for determining the gain.

The correction of the total amplification of a convergence channel in the case of the embodiment of the invention illustrated in FIG. 4 is now explained with the aid of FIG. 5:

During the measuring line denoted by I, the switch 41 connects the memory area 15b to the multiplier stage 26, with the result that a stored reference value RW is present at the first input of the multiplier stage 26. At the same time, the switch 31 connects the memory area 29b to the multiplier stage 26, with the result that a stored test matching factor f3T is present at the second input of the multiplier stage 26. The product of the values RW and f3T forms an input value for the D/A converter 16. The analogue output signal of the D/A converter 16 generates, in the correction coil 13, a test current iT which, for its part, causes, across the measuring shunt 14, a voltage drop Us1 which is proportional thereto and is currently smaller than the voltage Uref. The comparator 21 therefore supplies a digital output signal Us2 with the value 0. On the basis of the signal Us2 fed, the control unit 24 increments the factor f3T at the instant t1 by one step, and writes this value into the memory area 29b.

During the next measuring line II, the increased test matching factor f3T with the unchanged reference value RW becomes active and generates an increased test current iT and a voltage Us1 increased by ΔU. The measured voltage drop Us1 is still smaller than the reference voltage Uref, with the result that Us2 remains equal to 0, that is to say the correction undertaken is still not sufficient. Consequently, during the same measuring line II the factor f3T is incremented by a further step at the instant t2, and the test current iT is correspondingly increased.

A television picture is represented on the picture screen 1 between the measuring lines, for which reason the time axis is broken. The control unit 24 is designed such that the selection signal A is output as soon as a change occurs in the test matching factor f3T in the same direction. Consequently, the factor f3T present is copied into the memory area 29a as the factor f3A.

At the start of the next measuring line III the signal Us2 is still equal to 0, with the result that the factor f3T is incremented by a further step at the instant t3. Us1 now exceeds the desired value $U_{ref}$, whereupon the signal Us2 assumes the value 1. Consequently, the test matching factor f3T is decremented by one step at the instant t4 after an adjustable period, and this entails the lowering of the measured voltage Us1 by a step ΔU. If the control circuit 24 records a change in Us2 from 1 to 0 for this resetting, the test matching factor f3T is incremented again at the instant t5.

This oscillating motion of the test matching factor f3T is now periodically repeated further up to the instants t6 etc. The described oscillating motion takes place, however, only when no visible picture is traced. The matching factor f3A for the display mode always remains unchanged in this case, because the signal Us2 alternates between the values of 0 and 1. This has the advantage that, after an optimum setting has been reached, the television picture does not jitter on the picture screen, because the correction current does not change in the display mode.

The correction of the matching factor f3A for the display mode is found from experience to occur relatively infrequently, because the entire circuit principally serves to correct long-term fluctuations which are caused by temperature effects, in particular after the receiver is switched on. However, experience has shown that such a rare change in the matching factor f3A or the correction current, and thus a change in the position of the deflecting raster does not have a disturbing effect.

The circuit can also be constructed in such a way that the change in the correction current does not occur until the described deviation from the desired value $U_{ref}$ is several steps ΔU, for example 2, 3 or 4 steps.

The analogous exemplary embodiment of the invention illustrated in FIG. 3 functions basically in exactly the way just explained. The difference consists essentially in that the function of the matching factors F3A and f3T is taken over by control voltages which are applied to the amplifier 17' in order to control its gain. As explained for the exemplary embodiment with the digital matching factors, the control voltage for the amplifier 17' oscillates about the optimum value. The correction current for the deflecting raster of the visible picture is changed, however, only when a deviation of the measured voltage Us1 from the desired voltage Uref by a specific amount is established.

What is claimed is:

1. A method For convergence correction in a colour television receiver, the method comprising the steps of:
   a) reading a reference value from a memory,
   b) converting the reference value into an analogue signal,
   c) amplifying the analogue signal,
   d) measuring a current flowing in a convergence coil of a relevant convergence channel determined by the reference value forming an input variable of the convergence channel,
   e) determining a control signal which adjusts a gain applied to the reference value in such a way that the current approaches a specific magnitude, and
   f) repeating steps a) to e) for all convergence channels of the colour television receiver.

2. Method according to claim 1, wherein a magnitude of the current flowing in the convergence coil is determined by electric measurement.

3. Method according to claim 2, wherein
   a) a variable representing the current is compared with a reference variable in a comparison step, and
   b) an output signal dependent on a result of the comparison is generated.

4. Method according to claim 3, wherein a control unit acts on a circuit coupled to the convergence coil in such a way that a measured value of the variable approaches a value of the reference variable at intervals in time.

5. Method according to claim 3, wherein a control unit acts on a circuit coupled to the convergence coil in such a way that a measured value of the variable oscillates about a value of the reference variable at intervals in time.

6. Method according to claim 1, wherein the control signal is varied only when no visible picture is represented on a picture screen of the television receiver.

7. Method according to claim 1, wherein the control signal is varied during a vertical blanking interval.

8. Method according to claim 1, wherein the control signal is varied during representation of television pictures.

9. A television receiver having monochromatic picture tubes whose pictures can be projected onto a picture screen and each of which tubes has a correction device assigned to it, having a convergence circuit which comprises a memory in which correction values are stored, and which comprises a digital-to-analogue converter, which converts a stored digital correction value into an analogue signal, wherein the convergence circuit produces output signals to the correction devices, the output signals being generated by amplifying the analogue signals with a predetermined gain factor wherein the correction devices comprise in each case at least one correction coil and, for each said correction coil, one driver circuit, the correction devices being suitable for correcting image defects of the respective picture tubes on the picture screen by virtue of correction currents applied by the driver circuits to the associated correction coils, wherein the convergence circuit has control means by means of which the gain factor can be influenced in such a way that the correction current applied by each of the driver circuits has a specific value in each convergence channel for a specific correction value.

10. Colour television receiver according to claim 9, wherein the control means comprise electronically adjustable resistances.

11. Colour television receiver according to claim 9, wherein the control means comprise a multiplier stage which multiplies the stored correction value by a digital matching factor and outputs a product of such multiplication as a digital correction value to the digital-to-analogue converter.

12. Colour television receiver according to claim 9, wherein switching means are provided by means of which the television receiver can be switched between two operating modes.

13. Colour television receiver according to claim 9, wherein at least one reference value is stored in the memory.

* * * * *